US009886859B2

(12) United States Patent
Tomozawa et al.

(10) Patent No.: US 9,886,859 B2
(45) Date of Patent: Feb. 6, 2018

(54) PARKING ASSISTANCE DEVICE

(71) Applicant: AISIN SEIKI KABUSHIKI KAISHA, Kariya-shi, Aichi-ken (JP)

(72) Inventors: Motokatsu Tomozawa, Nagoya (JP); Norio Imai, Anjo (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/223,285

(22) Filed: Jul. 29, 2016

(65) Prior Publication Data
US 2017/0032681 A1 Feb. 2, 2017

(30) Foreign Application Priority Data
Jul. 31, 2015 (JP) .................. 2015-152503

(51) Int. Cl.
*G08G 1/16* (2006.01)
*B62D 15/02* (2006.01)

(52) U.S. Cl.
CPC .......... *G08G 1/168* (2013.01); *B62D 15/027* (2013.01); *B62D 15/0285* (2013.01)

(58) Field of Classification Search
CPC ... G08G 1/168; B62D 15/027; B62D 15/2085
USPC ........................................... 701/301
See application file for complete search history.

(56) References Cited

U.S. PATENT DOCUMENTS

| 7,469,965 | B2 | 12/2008 | Glover et al. | |
|---|---|---|---|---|
| 2002/0041239 | A1* | 4/2002 | Shimizu | B60R 1/00 340/932.2 |
| 2005/0049767 | A1* | 3/2005 | Endo | B62D 15/0285 701/36 |
| 2015/0025732 | A1* | 1/2015 | Min | B62D 15/0285 701/23 |

FOREIGN PATENT DOCUMENTS

| JP | 2006-508850 A | 3/2006 |
|---|---|---|
| JP | 2009-83806 A | 4/2009 |

* cited by examiner

*Primary Examiner* — Yazan A Soofi
(74) *Attorney, Agent, or Firm* — Sughrue Mion, PLLC

(57) ABSTRACT

A parking assistance device includes: a route determination unit determining a route from an initial position of a vehicle to a target position at a time of assisting the vehicle to be parked in a parking area, wherein the route determination unit includes a first generation unit generating a first circumference being tangent to a line passing through the target position and extending along the forward direction, a second generation unit generating a second circumference being tangent to a line passing through the initial position and extending along a forward direction and to the first circumference, and a recalculation determination unit generating a third circumference having a center at the position on an obstacle in the front direction nearest to the route, and determining whether the recalculation of the route is necessary based on the first and third circumferences.

3 Claims, 13 Drawing Sheets

FORWARD DIRECTION OF VEHICLE (FRONT DIRECTION)

PARKING ASSISTANCE DEVICE

CROSS REFERENCE TO RELATED APPLICATIONS

This application is based on and claims priority under 35 U.S.C. §119 to Japanese Patent Application 2015-152503, filed on Jul. 31, 2015, the entire contents of which are incorporated herein by reference.

TECHNICAL FIELD

This disclosure relates to a parking assistance device.

BACKGROUND DISCUSSION

A device is known, which assists parallel parking by setting a route for the parallel parking of a vehicle. In such a parking assistance device, a technology is known, in which, for example, in a case where it is not possible to park the vehicle using the calculated route, the route is recalculated and set again.

JP 2009-83806A is an example of the related art.

However, in the technology in the related art, there is no disclosure regarding the recalculation of an available route for parking after one calculation, and there is a problem in that unnecessary recalculation of the route for the parallel parking which requires a large amount of calculation processing is executed.

SUMMARY

Thus, a need exists for a parking assistance device which is not suspectable to the drawback mentioned above.

A parking assistance device according to an aspect of this disclosure includes a route determination unit that determines a route from an initial position of a vehicle to a target position at a time of assisting the vehicle to be parked in a parking area. The route determination unit includes; a first generation unit that generates a first circumference which has a turning radius at the time of a minimum turning of the vehicle as a radius, and is tangent to a straight line passing through the target position and extends along a forward direction of the vehicle, a second generation unit that generates a second circumference which is tangent to a straight line passing through the initial position and extending along a forward direction of the vehicle and is tangent to the first circumference, and a recalculation determination unit that generates a third circumference having a center at the position on an obstacle disposed in the front direction of the vehicle nearest to the route at the time of parking the vehicle and having a predetermined radius, and determines whether or not the recalculation of the route is necessary based on the first circumference and the third circumference. A part of the first circumference functions as a part of the route, and a part of the second circumference functions as a part of the route subsequent to the part of the first circumference.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment will be disclosed herein. Configurations in the embodiment described hereinafter and actions, results and effects brought by the configuration are merely examples. This disclosure can also be realized by a configuration other than that disclosed in the embodiment described hereinafter, and at least one of various effects and derivative effects based on the basic configuration can be obtained.

In the present embodiment, a vehicle 1 may be, for example, an automobile of which a drive source is an internal combustion engine (not illustrated), that is, an internal combustion engine vehicle, may be an automobile of which the drive source is an electric motor (not illustrated), that is, an electric vehicle, fuel-cell vehicle or the like, may be a hybrid vehicle of which a drive source is both the internal combustion engine and the electric motor, or may be a vehicle having another drive source. In addition, on the vehicle 1, various transmissions can be mounted, or various devices such as a system or components necessary for driving the internal combustion engine and the electric motor can be mounted. In addition, the method, number, and layout of devices relating to driving of vehicle wheels 3 of the vehicle 1 can be set variously.

Figure 1:
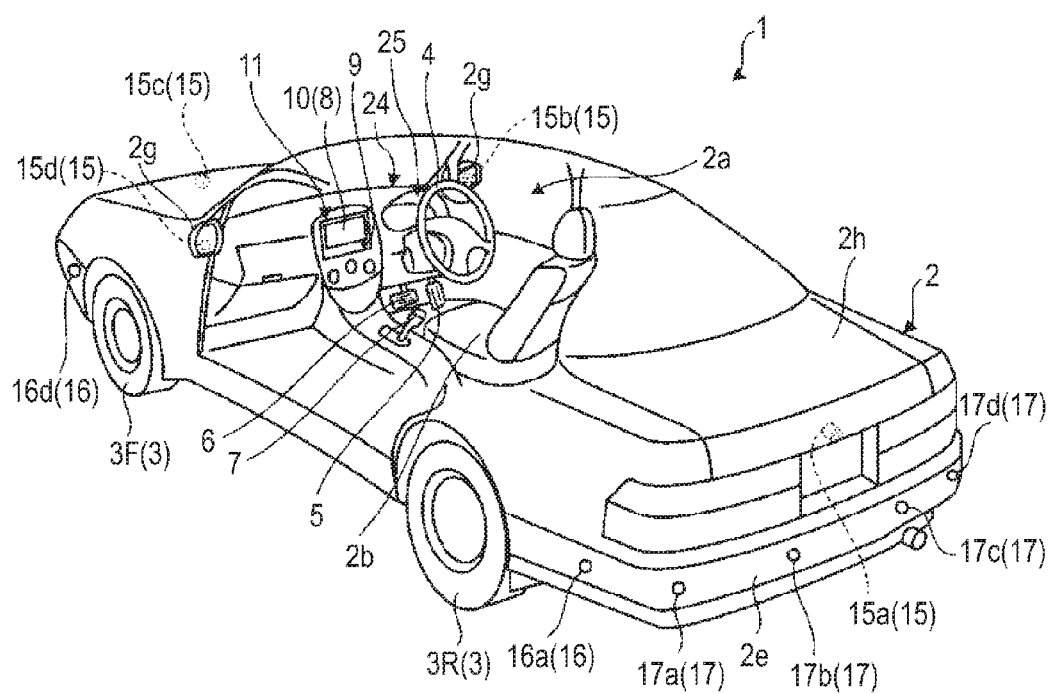
FIG. 1 is an exemplary perspective view illustrating a state in which a part of a passenger compartment of a vehicle in an embodiment is seen.

FIG. 1 is an exemplary perspective view illustrating a state in which a part of a passenger compartment of a vehicle is seen in perspective in the embodiment.

Figure 2:
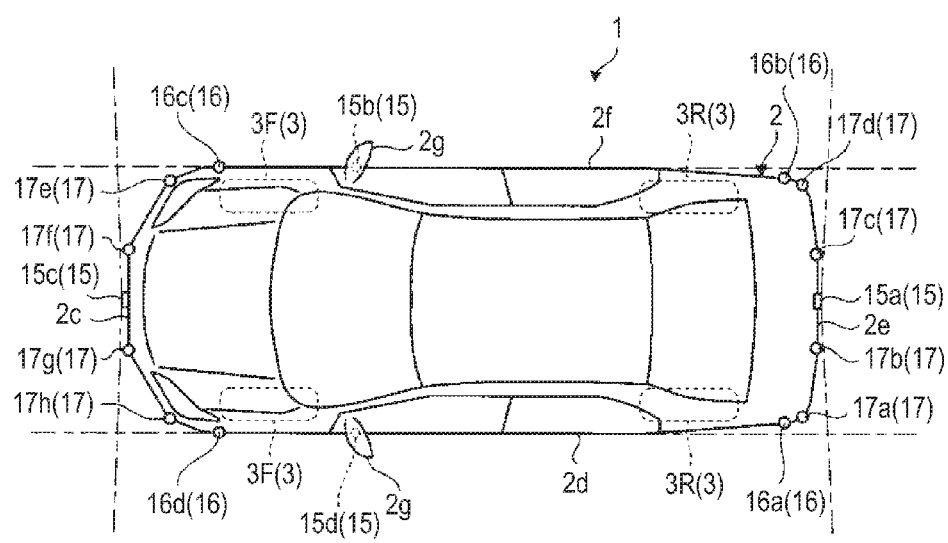
FIG. 2 is an exemplary plan view (overhead view) illustrating the vehicle in the embodiment.

FIG. 2 is an exemplary plan view (overhead view) illustrating the vehicle in the embodiment.

As illustrated in FIG. 1, a vehicle body 2 configures a passenger compartment 2a in which occupant (not illustrated) are seated. In the passenger compartment 2a, a steering section 4, an acceleration operation section 5, a brake operation section 6, and a shift operation section 7 are provided in a state of facing a seat 2b of a driver as the occupants.

The steering section 4 is, for example, a steering wheel protruded from a dashboard 24, the acceleration operation section 5 is, for example, an accelerator pedal positioned under a foot of the driver, the brake operation section 6 is, for example, a brake pedal positioned under the foot of the driver, and the shift operation section 7 is, for example, a shift lever protruding from a center console. The steering section 4, the acceleration operation section 5, the brake operation section 6, and the shift operation section 7 are not limited to those described above.

In addition, a display device 8 as a display output unit and a voice output device 9 as a voice output unit are provided in the passenger compartment 2a. The display device 8 is, for example, a liquid crystal display (LCD), an organic electroluminescent display (OELD), or the like. The voice output device 9 is, for example, a speaker. In addition, the display device 8 is covered by a transparent operation input unit 10 such as a touch panel. The occupants can visually recognize an image displayed on a display screen of the display device 8 via the operation input unit 10. In addition, the occupants can execute an operation input by operations such as touching, pressing or moving the operation input unit 10 by a finger or the like on a position corresponding to the image displayed on the display screen of the display device 8. The display device 8, the voice output device 9, and the operation input unit 10 are provided on a monitor device 11 position on the dashboard 24 at a center portion in a vehicle width direction, that is, a horizontal direction. The monitor device 11 can include an operation input unit (not illustrated) such as a switch, a dial, a joystick, a press button, or the like. In addition, a voice output device (not illustrated) can be provided at another position in the passenger compartment 2a that is different from the position of the monitor device 11, or the voice can be output from another voice output device that is different from the voice output device 9 of the monitor device 11. The monitor device 11 is also used as, for example, a navigation system or an audio system.

A display device 12 which is different from the display device 8 is provided in the passenger compartment 2a.

Figure 3:
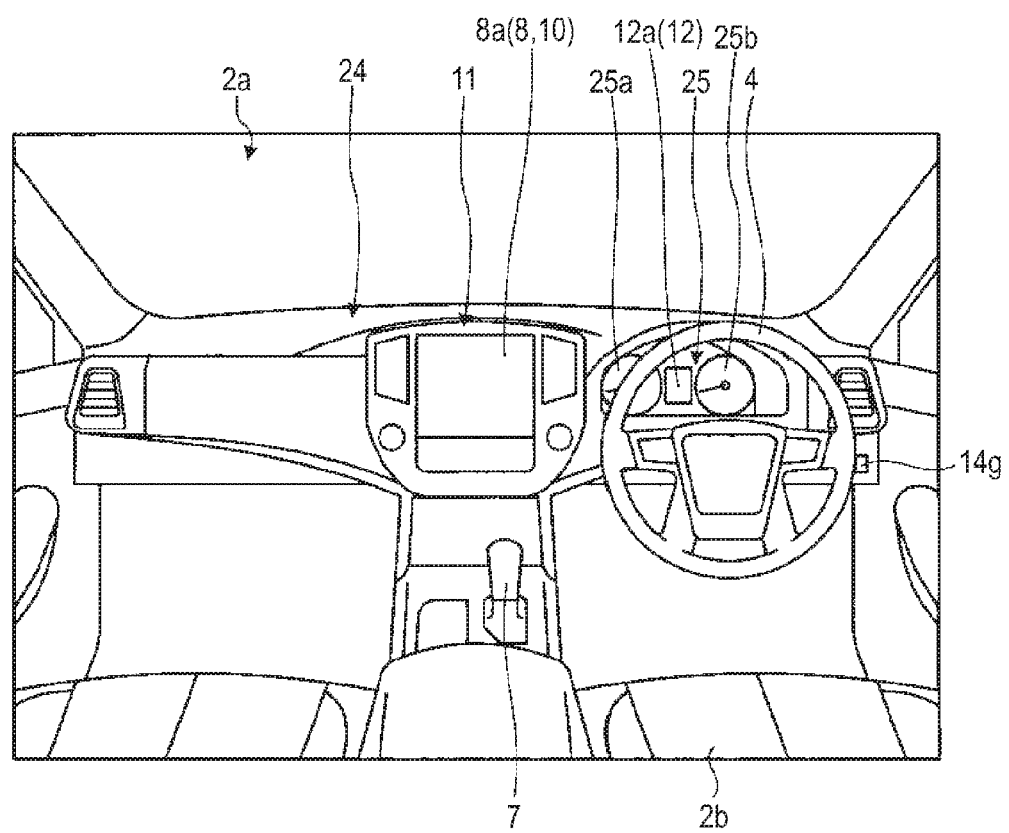
FIG. 3 is a diagram illustrating an example of a dashboard of the vehicle in the embodiment seen from a rear side of the vehicle.

FIG. 3 is a diagram illustrating an example of a dashboard of the vehicle in the embodiment seen from a rear side of the vehicle.

As illustrated in FIG. 3, the display device 12 is provided, for example, on an instrument panel section 25 of the dashboard 24, and is positioned between a speed display section 25a and a rotational speed display section 25b at the substantially center of the instrument panel section 25. A size of a screen 12a of the display device 12 is smaller than a size of a screen 8a of the display device 8. An image indicating information relating to the parking assistance of the vehicle 1 is mainly displayed on this display device 12. An amount of information displayed on the display device 12 may be smaller than an amount of information displayed on the display device 8. The display device 12 is, for example, the LCD or the OELD. The information displayed on the display device 12 may be displayed on the display device 8.

In addition, as illustrated in FIG. 1 and FIG. 2, the vehicle 1 is a four wheel vehicle, and includes right and left front wheels 3F and right and left rear wheels 3R. Any of these four vehicle wheels 3 are configured so as to be steered.

Figure 4:
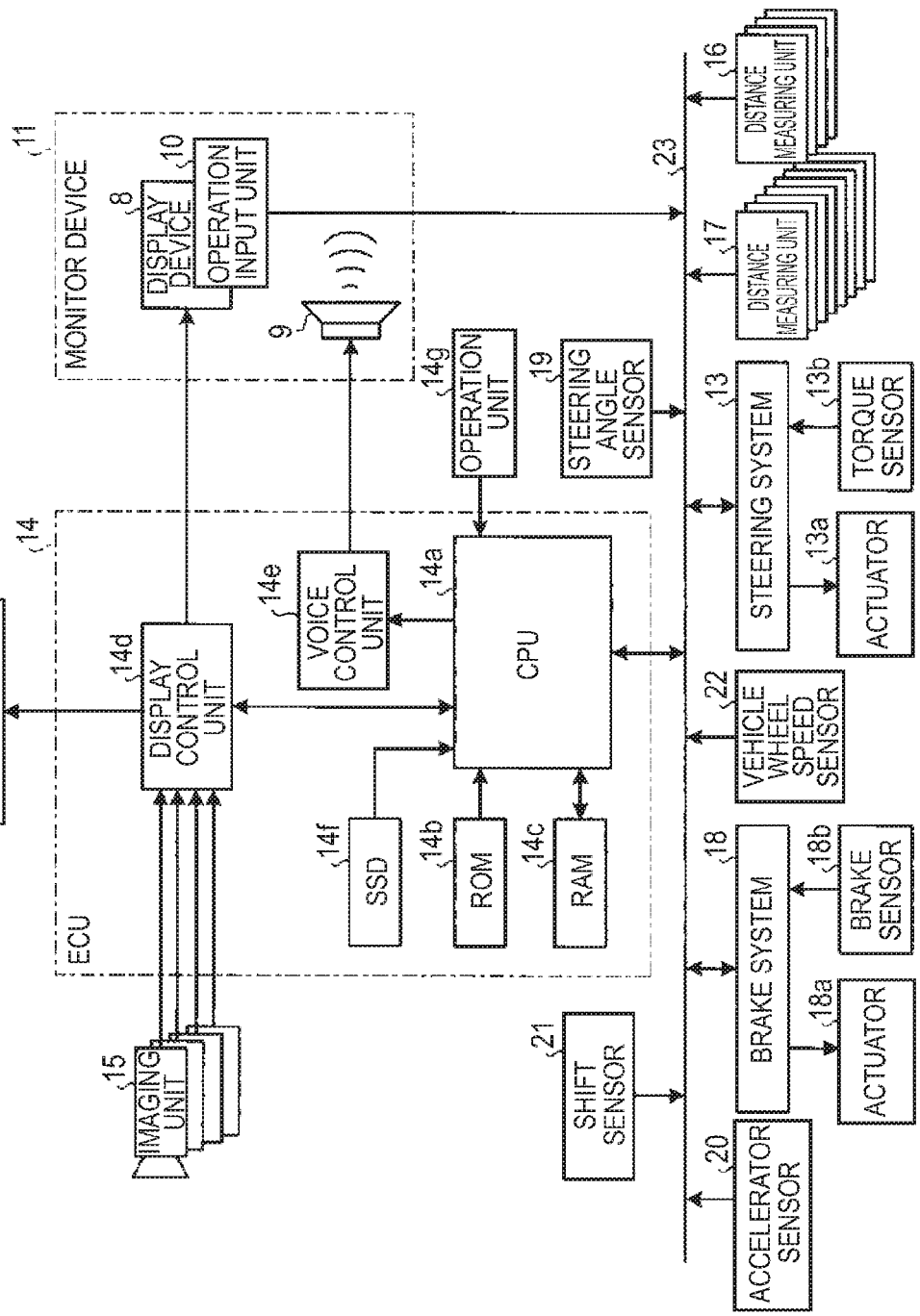
FIG. 4 is an exemplary block diagram illustrating a configuration of a parking assistance system in the embodiment.

FIG. 4 is an exemplary block diagram illustrating a configuration of a parking assistance system in the embodiment.

As illustrated in FIG. 4, the vehicle 1 includes a steering system 13 that steers at least two vehicle wheels 3. The steering system 13 includes an actuator 13a and a torque sensor 13b. The steering system 13 is electrically controlled by an electronic control unit (ECU) 14 or the like, and operates the actuator 13a. The steering system 13 is, for example, an electric power steering system, a steer by wire (SBW) system, or the like. The steering system 13 supplements a steering force by adding a torque, that is, a assistant torque to the steering section 4 using the actuator 13a or steers the vehicle wheels 3 using the actuator 13a. In this case, the actuator 13a may steer one vehicle wheel 3 or may steer a plurality of vehicle wheels 3. In addition, the torque sensor 13b detects, for example, a torque given to the steering section 4 from the user.

In addition, as illustrated in FIG. 2, for example, four imaging units 15a to 15d are provided on the vehicle body 2 as a plurality of imaging units 15. The imaging unit 15 is a digital camera in which an imaging element such as a charge coupled device (CCD) or a CMOS image sensor (CIS) is incorporated. The imaging unit 15 can output moving picture data in a predetermined frame rate. The imaging unit 15 respectively includes a wide-angle lens and a fish-eye lens and can image a range of, for example, 140° to 190° in the horizontal direction. In addition, an optical axis of the imaging unit 15 is set obliquely downward. Accordingly, the imaging unit 15 sequentially images an external environment around the vehicle body 2 including a road surface where the vehicle 1 can move or an area where the vehicle 1 can park, and outputs the image as imaged image data.

The imaging unit 15a is positioned, for example, at an end portion 2e on the rear side of the vehicle body 2 and is provided on a wall portion at a lower side of a door 2h of a rear trunk. The imaging unit 15b is positioned, for example, at an end portion 2f on the right side of the vehicle body 2 and is provided on a right side rear view mirror 2g. The imaging unit 15c is positioned, for example, at an end portion 2c on the front side, that is, the front side in the longitudinal direction of the vehicle body 2 and is provided on a front bumper or the like. The imaging unit 15d is positioned, for example, at an end portion 2d on the left side, that is, the left side in the vehicle width direction of the vehicle body 2 and is provided on a rear view mirror 2g as a left side protrusion portion. The ECU 14 executes calculation processing and image processing based on the image data obtained from the plurality of imaging units 15, and then, can generate an image of a wide viewing angle or generate a virtual bird's-eye view image viewed from above the vehicle 1. The bird's-eye view image is referred to as a plane image.

In addition, the ECU 14 identifies partition lines or the like indicated on the road surface around the vehicle 1 from the image imaged by the imaging unit 15, and detects (extracts) a parking section indicated by the partition lines.

In addition, as illustrated in FIG. 1 and FIG. 2, for example, four distance measuring units 16a to 16d and eight distance measuring units 17a to 17h are provided on the vehicle body 2 as a plurality of distance measuring units 16 and 17. The distance measuring units 16 and 17 are, for example, sonar items that emit ultrasonic wave and catch reflected wave. The sonar is also referred to as a sonar sensor, an ultrasonic detector, or ultrasonic sonar. The ECU 14 can identify the presence of the object such as the obstacle or the like positioned around the vehicle 1 and can measure the distance to the object according to the result of detection by the distance measuring units 16 and 17. That is, the distance measuring units 16 and 17 are examples of the detection units that detect the object. The distance measuring unit 17 is used for detecting, for example, an object of relatively short distance, and the distance measuring unit 16 is used for detecting, for example, an object of relatively longer distance than the distance measuring unit 17. In addition, the distance measuring unit 17 is used for detecting an object at the front and rear of the vehicle 1, and the distance measuring unit 16 is used for detecting an object at the sides of the vehicle 1.

In addition, as illustrated in FIG. 4, in a parking assistance system 100, a brake system 18, a steering angle sensor 19, an accelerator sensor 20, a shift sensor 21, and a vehicle wheel speed sensor 22 are electrically connected to each other via an in-vehicle network 23 as a telecommunication line in addition to the ECU 14, the monitor device 11, the steering system 13, and the distance measuring units 16 and 17.

The in-vehicle network 23 is configured, for example, as a controller area network (CAN). The ECU 14 can control the steering system 13, brake system 18, or the like by sending a control signal via the in-vehicle network 23. In addition, the ECU 14 can receive the result of detection by the torque sensor 13b, the brake sensor 18b, the steering angle sensor 19, the distance measuring unit 16, the distance measuring unit 17, the accelerator sensor 20, the shift sensor 21, the vehicle wheel speed sensor 22, and the like, or an operation signal of the operation input unit 10 via the in-vehicle network 23.

The ECU 14 includes, for example, a central processing unit (CPU) 14a, a read only memory (ROM) 14b, a random access memory (RAM) 14c, a display control unit 14d, voice control unit 14e, a solid state drive (SSD) 14f (flash memory), or the like. The CPU 14a can execute various calculation processing and control such as image processing relating to the image displayed on the display devices 8 and 12, determination of a moving target position (parking target position, target position) of the vehicle 1, calculation of the guidance route (guidance route, parking route, parking guidance route) of the vehicle 1, determination of a presence or absence of the interference with the object, an automatic control of the vehicle 1, release of the automatic control, and the like. The CPU 14a can read out a program installed and stored in a non-volatile storage device such as the ROM 14b, and can execute the calculation processing according to the program. The RAM 14c temporarily stores various data used for the calculation by the CPU 14a. In addition, the display control unit 14d mainly executes the image processing using the image data obtained by the imaging unit 15 and the composition of the image data to be displayed on the display device 8 among the calculation processing items in the ECU 14. In addition, the voice control unit 14e mainly executes processing of the voice data output from the voice output device 9 among the calculation processing items in the ECU 14. In addition, the SSD 14f is a rewritable non-volatile storage unit, and can store data even in a case where the power of the ECU 14 is turned off. The CPU 14a, ROM 14b, RAM 14c, and like are integrated in one package. In addition, the ECU 14 may be configured to use another logical operation processor or a logic circuit such as a digital signal processor (DSP) or the like instead of the CPU 14a. In addition, a hard disk drive (HDD) may be provided instead of the SSD 14f, and the SSD 14f and the HDD may be provided separate from the ECU 14.

The brake system 18 is, for example, an anti-lock brake system (ABS) that suppresses a locking of the brake, an electronic stability control (ESC) that suppresses skidding of the vehicle 1 at the time of cornering, an electric brake system that enhances the braking force (executes a braking assist), a brake by wire (BBW), and the like. The brake system 18 gives a braking force to the vehicle wheels 3, and eventually to the vehicle 1 via the actuator 18a. In addition, brake system 18 can detect a locking of the brake, idling of the vehicle wheels 3, or signs of skidding from the rotation difference between the right and left vehicle wheels 3, and can execute various controls. A brake sensor 18b is, for example, a sensor that detects a position of a movable portion of the brake operation section 6. The brake sensor 18b can detect the position of the brake pedal as the movable portion of the brake operation section 6. The brake sensor 18b includes a displacement sensor.

The steering angle sensor 19 is a sensor that detects an amount of steering of the steering section 4 such as the steering wheel. The steering angle sensor 19 is configured using, for example, a hall element or the like. The ECU 14 acquires the amount of steering of the steering section 4 by the user or an amount of steering of each vehicle wheel 3 in a case of automatic steering from the steering angle sensor 19, and executes various controls. The steering angle sensor 19 detects a rotation angle of a rotating part included in the steering section 4. The steering angle sensor 19 is an example of an angle sensor.

The accelerator sensor 20 is, for example, a sensor that detects a position of a movable portion of the acceleration operation section 5. The accelerator sensor 20 can detect the position of the accelerator pedal as the movable portion. The accelerator sensor 20 includes a displacement sensor.

The shift sensor 21 is, for example, a sensor that detects a position of a movable portion of the shift operation section 7. The shift sensor 21 can detect a position of a lever, an arm, a button, or the like as the movable portion of the shift operation section 7. The shift sensor 21 may include a displacement sensor or may be configured as a switch.

The vehicle wheel speed sensor 22 is a sensor that detects an amount of rotation or the number of rotations of the vehicle wheels 3 per unit time. The vehicle wheel speed sensor 22 outputs the number of the vehicle wheel speed pulses indicating the detected number of rotations as a sensor value. The vehicle wheel speed sensor 22 is configured using, for example, the hall element or the like. The ECU 14 calculates an amount of movement of the vehicle 1 based on the sensor value acquired from the vehicle wheel speed sensor 22, and executes various controls. In some cases, the vehicle wheel speed sensor 22 is provided on the brake system 18. In this case, the ECU 14 acquires the result of detection by the vehicle wheel speed sensor 22 via the brake system 18.

The configuration, the arrangement, the electrical connection form of various sensors and the actuator described above are just examples, and can be variously set (changed).

In the present embodiment, the ECU 14 realizes at least a part of the functions as the parking assistance device by co-working of hardware and software (a control program).

Figure 5:
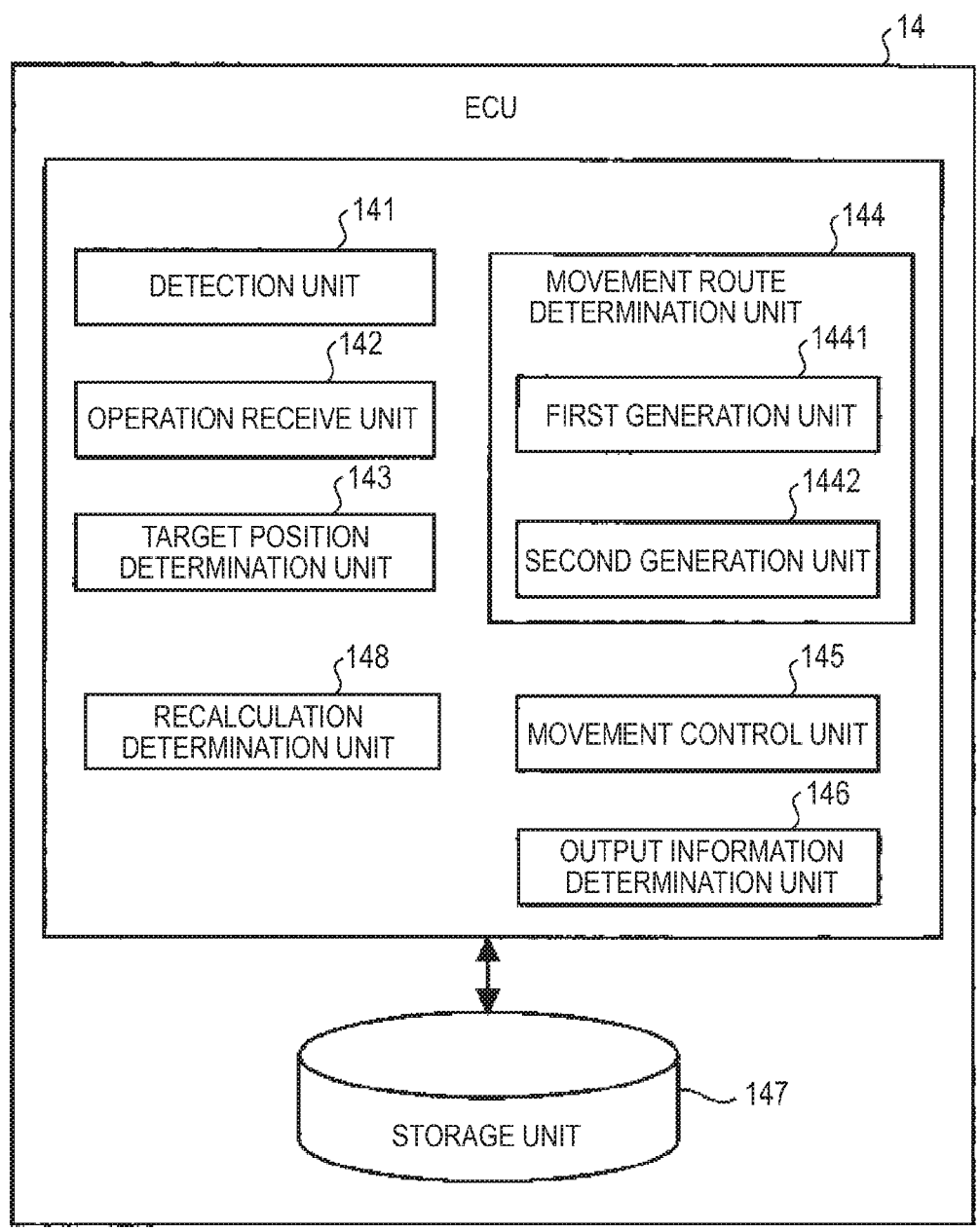
FIG. 5 is an exemplary block diagram illustrating a configuration of a part of an ECU of the parking assistance system in the embodiment.

FIG. 5 is a functional configuration block diagram of the ECU 14.

As illustrated in FIG. 5, the ECU 14 functions as a detection unit 141, an operation receive unit 142, a target position determination unit 143, a movement route determination unit 144, a movement control unit 145, an output information determination unit 146, a recalculation determination unit 148, and a storage unit 147.

In the configuration described above, the detection unit 141 detects obstacles such as another vehicle or a column, or a border line such as a parking stall line.

The operation receive unit 142 acquires an operation signal by the operation input of an operation unit 14g. Here, the operation unit 14g is configured from, for example, a push button, a switch or the like, and outputs the operation signal.

The target position determination unit 143 determines the target parking position of the vehicle 1.

The movement route determination unit 144 determines the movement route from the initial position of the vehicle 1 to the target parking position at the time of the parking assistance of the parallel parking of the vehicle 1 to the parking available area. In the present embodiment, the movement route determination unit 144 generates two circles and determines the movement route. As illustrated in FIG. 5, the movement route determination unit 144 includes a first generation unit 1441 and a second generation unit 1442.

The first generation unit 1441 generates a circumference (a first circumference) of a first circle having a radius as a turning radius at the time of the minimum turning of the vehicle 1, and is tangent to a straight line that passes through the target position and extends along the forward direction of the vehicle 1 on the target position. A part of the circumference of the first circle functions as a part of the movement route.

The second generation unit 1442 generates a circumference (second circumference) of a second circle, which is tangent to a straight line extending along the forward direction of the vehicle 1 passing through the initial position PS of the vehicle 1 and is tangent to the circumference of the first circle. A part of the circumference of the second circle functions as a part of the movement route subsequent to the part of the circumference of the first circle.

The movement control unit 145 (a control unit) controls each unit of the vehicle 1 such that the vehicle 1 moves to the target parking position along the movement route.

The output information determination unit 146 determines information items output from the display devices 12 and 8 or the voice output device 9, and an output aspect of the information items.

The recalculation determination unit 148 generates a circumference of a third circle having a center at a position nearest to the route of the obstacles such as parked vehicles disposed in the front direction of the vehicle 1 at the time of parking the vehicle 1 and having a predetermined radius, and determines whether or not the recalculation of the movement route is necessary based on the circumference of the first circle and the circumference of the third circle.

The storage unit 147 stores data used in calculation in the ECU 14 or data calculated by the calculation in the ECU 14.

Figure 6:
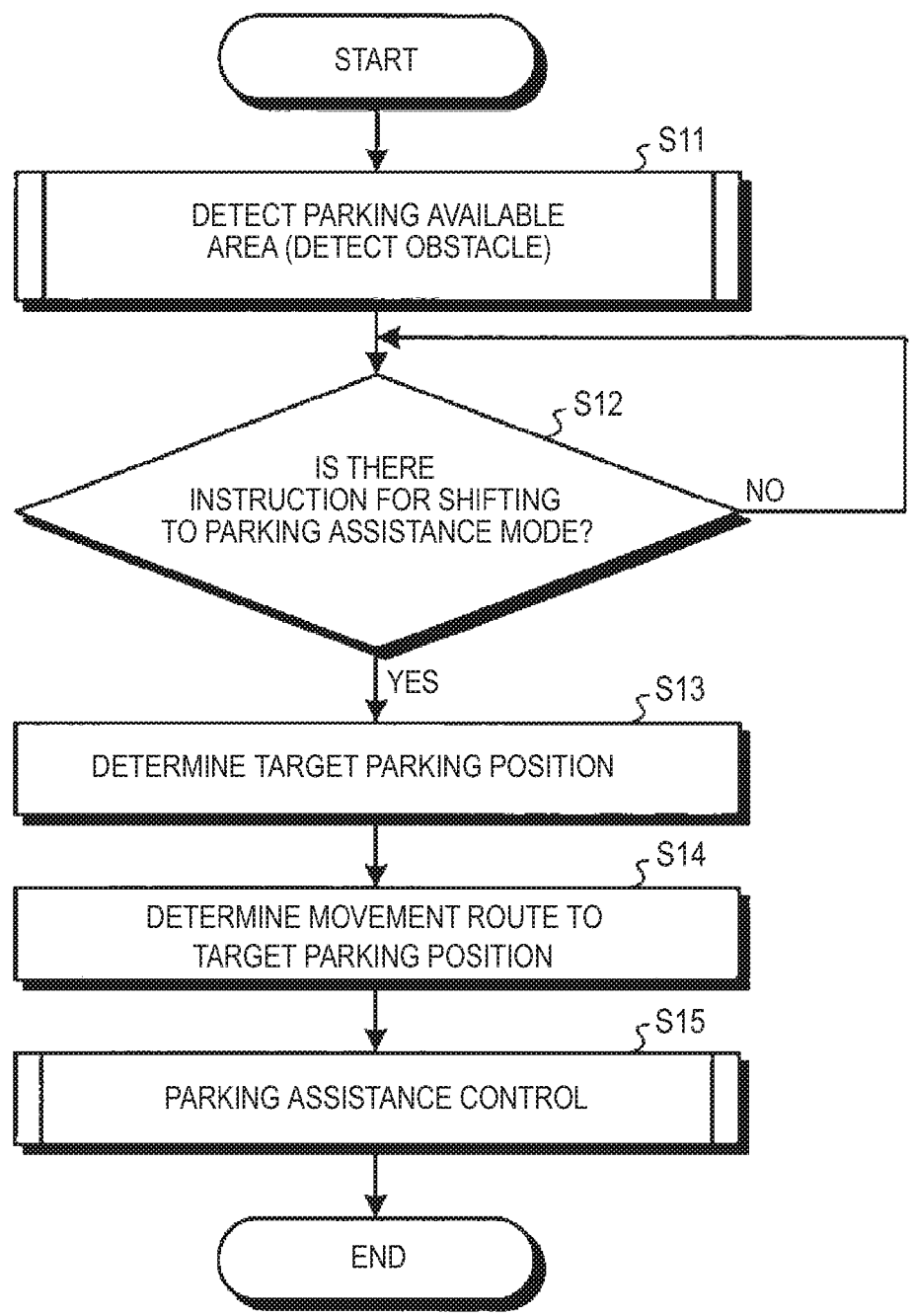
FIG. 6 is a flowchart illustrating an overview of processing in the embodiment.
Figure 7:
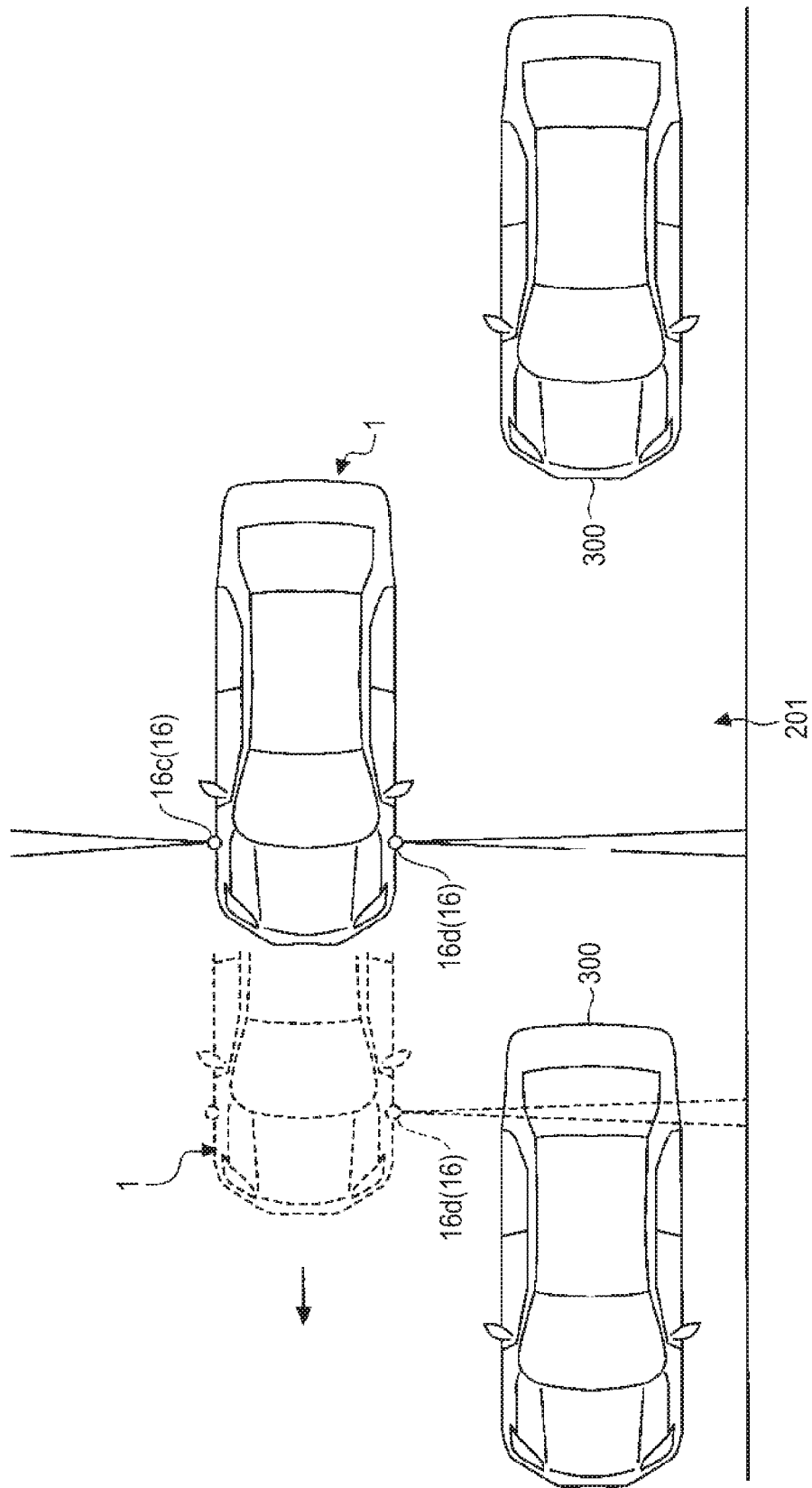
FIG. 7 is a diagram describing a detection of a parking available area in the embodiment.

Next, operations in the embodiment will be described. FIG. 6 is a flowchart illustrating an overview of processing in the embodiment. First, the ECU 14 performs the detection of the parking available area (detection of the obstacle) (STEP S11). FIG. 7 is a diagram describing the detection of the parking available area. Specifically, the distance measuring units 16c and 16d calculates the distance to the obstacle such as another vehicle 300 for each sampling timing, and outputs the calculation result as data corresponding to the reflected portion (a set of the reflection point of the sound wave or the like) of the obstacle. The output data is stored, for example, in the RAM 14c for each output period.

Then, the ECU 14 functions as the detection unit 141 and detects a parking available area 201 positioned at the side direction of the vehicle 1 based on the output data from the distance measuring unit 16d. Specifically, in a case where the output data is output, which corresponds to the case where the output data corresponding to the obstacle is output for a period of equal to or longer than a period corresponding to a first predetermined length, and thereafter, the obstacle is not present for a period of equal to or longer than a second predetermined period corresponding to a minimum width required for the parking available area for the vehicle 1 (including a case where the distance to the obstacle is equal to or longer than the vehicle length in the longitudinal direction of the vehicle required for the parking of the vehicle 1), the detection unit 141 determines that the parking available area 201 is present.

In addition, the detection unit 141 can detect the parking available area 201 by performing an edge extraction using image data of the parking stall lines such as white lines provided on the travelling surface such as a ground surface or a road surface based on the image data output from the imaging unit 15d that images the left side direction of the vehicle 1.

Subsequently, the ECU 14 functions as the operation receive unit 142, and determines whether or not there is an instruction for shifting the mode to the parking assistance mode via the operation unit 14g (STEP S12).

In the determination in STEP S12, in a case where there is no instruction for shifting the mode to the parking assistance mode yet via the operation unit 14g (No in STEP S12), the process is in standby state.

In the determination in STEP S12, in a case where there is an instruction for shifting the mode to the parking assistance mode via the operation unit 14g (Yes in STEP S12), the ECU 14 functions as the target position determination unit 143, and determines the target parking position of the vehicle 1 (STEP S13).

Subsequently, the ECU 14 functions as the movement route determination unit 144, and determines the movement route to the target parking position of the vehicle 1 (STEP S14).

Figure 8:
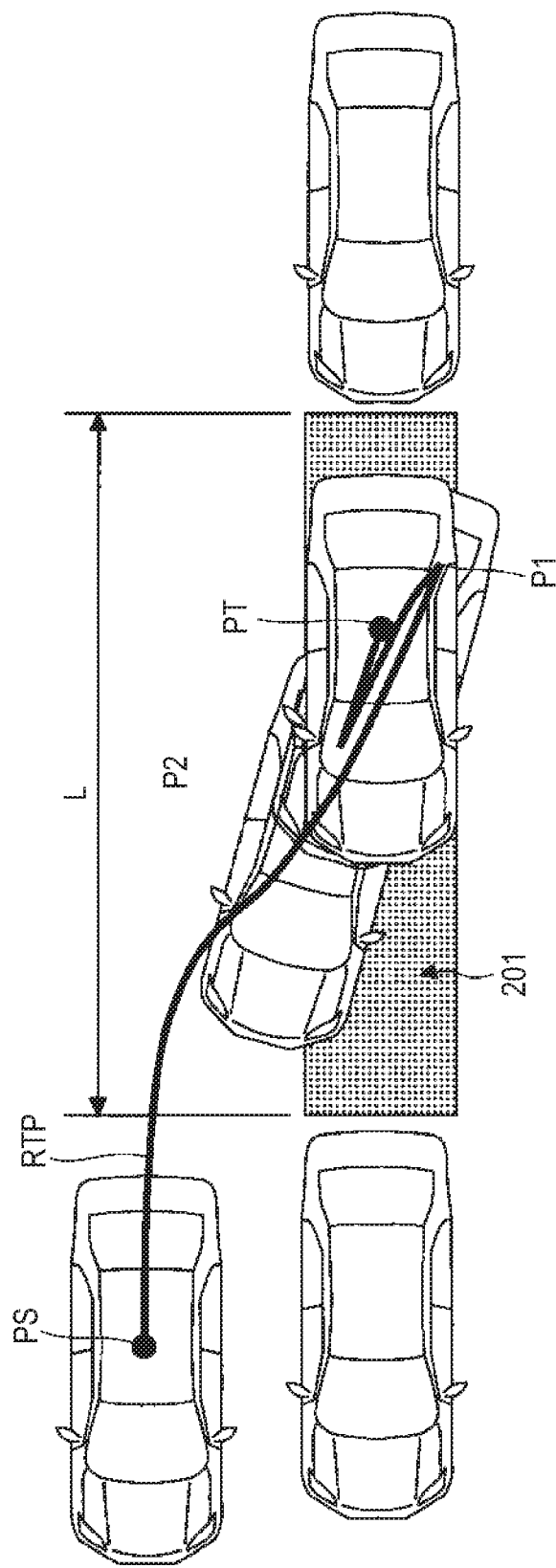
FIG. 8 is a diagram describing an example of setting a movement route in the embodiment.

FIG. 8 is a diagram describing an example of setting a movement route. A case of the movement route having two forward and backward turning positions P1 and P2 of the steering wheel as the steering section 4 is described in FIG. 8.

A movement route RTP in FIG. 8 is a route in which the vehicle 1 moves backward by turning the steering wheel as the steering section 4 to the left by a predetermined amount from the initial position PS of the vehicle 1 at the time of starting the parking assistance control processing to move toward the turning position P1 of the steering wheel as the steering section 4. Then, in the movement route RTP, the driver presses the brake pedal as the brake operation section 6 to stop the vehicle 1 at the turning position P1, changes the gear to "forward", and slightly turns the steering wheel as the steering section 4, and then, the vehicle 1 moves toward the turning position P2 of the steering wheel as the steering section 4. Then, in the movement route RTP, the driver presses the brake pedal as the brake operation section 6 to stop the vehicle 1 at the turning point P2, changes the gear to "backward", and then, the vehicle 1 moves toward the target parking position PT.

Here in FIG. 8, L is a parking space length which is a width for the vehicle 1 enters the parking available area 201.

When detecting the parking available area 201, the detection unit 141 calculates the parking space length L.

Figure 9:
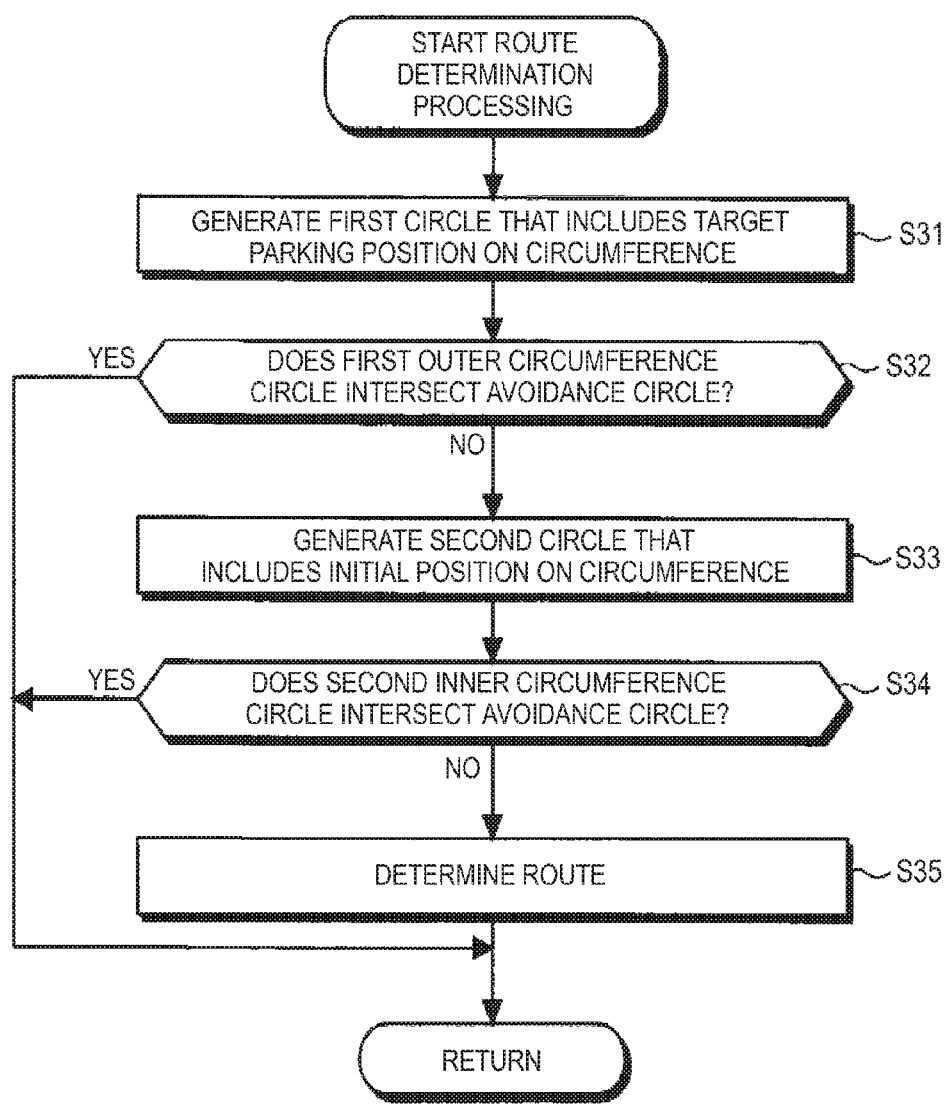
FIG. 9 is a flowchart illustrating a procedure of route determination processing in the embodiment.

Moreover, in the present embodiment, the movement route RTP is determined as described below. FIG. 9 is a flowchart illustrating a procedure of route determination processing in the present embodiment.

The ECU 14 functions as the first generation unit 1441 of the movement route determination unit 144, and generates a first circle S1 that includes the target parking position PT of the vehicle 1 on the circumference thereof (STEP S31).

Figure 10:
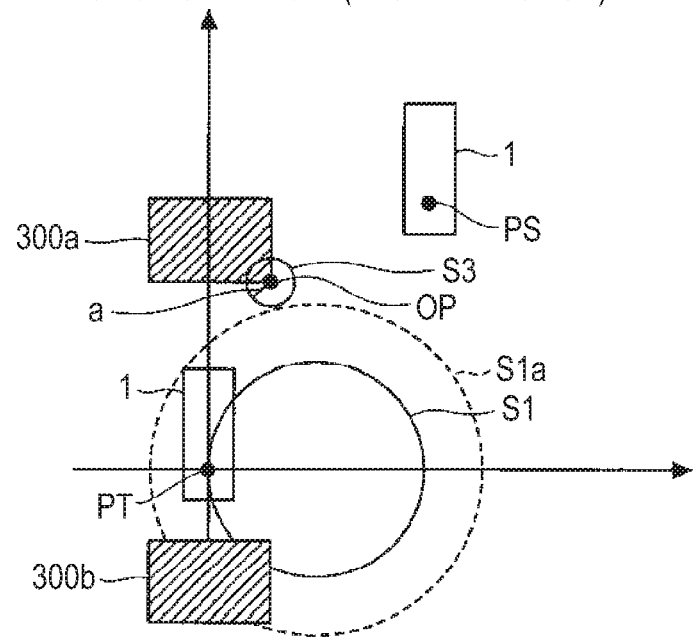
FIG. 10 is a diagram illustrating an overview of generating a first circle in the embodiment.

FIG. 10 is a diagram illustrating an overview of generating the first circle S1. A parked vehicle parked in the front direction of the parking available area and a parked vehicle parked in the rear direction of the parking available area are schematically illustrated in FIG. 10 in reference signs 300a and 300b respectively. In addition, an angle of the rear portion (rear angle) of the parked vehicle 300a in the front direction at the initial position PS side is illustrated in a reference sign OP in FIG. 10. The initial position PS of the vehicle 1 is a position of a center of the rear wheel shaft of the vehicle 1 at the time of parking starting. The rear end portion OP is an end portion of the parked vehicle 300a in the front direction nearest to the movement route RTP.

As illustrated in FIG. 10, the ECU 14 generates a circle that passes through the target parking position PT, has a radius which is a turning radius at the time of minimum turning of the vehicle 1, and is tangent to a straight line extending along the forward direction of the vehicle 1 at the target parking position PT, as the first circle S1. Here, the minimum turning means a case where the vehicle 1 turns with a maximum steering angle, and the minimum turning radius means a radius of an arc drawn by the center of the rear wheels shaft of the vehicle 1 at the time of the minimum turning. The turning radius of the center of the rear wheels shaft of the vehicle 1 at the time of minimum turning of the vehicle 1 is a known value determined in advance using the maximum steering angle of the vehicle 1 and the center position of the rear wheels shaft of the vehicle 1.

Returning to FIG. 9, the ECU 14 determines whether or not a first outer circumference circle S1a and an avoidance circle S3 intersect each other (STEP S32). The first outer circumference circle S1a is a trajectory on which the left front end portion of the vehicle 1 passes, which is the outermost side end portion of the vehicle 1 in a case where the vehicle 1 moves along the first circle S1. A radius of the first outer circumference circle S1a is a known value determined in advance using the maximum steering angle of the vehicle 1 and the length of the vehicle 1 (vehicle length) in the longitudinal direction.

The circumference of the avoidance circle S3 is an example of the third circumference. The avoidance circle S3 is a circle having a center at the rear right end portion OP of the parked vehicle 300a in the front direction and having a radius as a predetermined avoidance margin a. Here, the avoidance margin a (avoidance distance) is set by the driver in advance and is a margin of a distance set in order to avoid the collision with the rear right end portion OP of the parked vehicle 300a in the front direction. Therefore, the fact that the first outer circumference circle S1a intersects the avoidance circle S3 means that there is possibility that a left front end portion of the vehicle 1 approaches or collides with the rear right end portion OP of the parked vehicle 300a in the front direction.

In a case where it is determined that the first outer circumference circle S1a intersects the avoidance circle S3 (Yes in STEP S32), since the movement route RTP cannot be generated, the ECU 14 ends the route determination processing.

In a case where it is determined that the first outer circumference circle S1a does not intersect the avoidance circle S3 (No in STEP S32), the ECU 14 functions as the second generation unit 1442 and generates the second circle S2 that includes the initial position PS on the circumference thereof (STEP S33).

Figure 11:
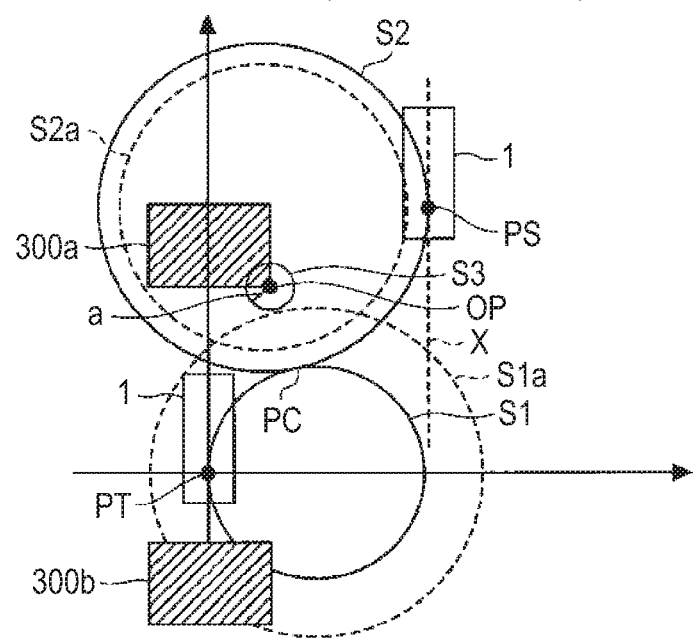
FIG. 11 is a diagram illustrating an overview of generating a second circle in the embodiment.

FIG. 11 is a diagram illustrating an overview of generating a second circle S2. The ECU 14 generates the second circle S2 that is tangent to a straight line (X) passing through the initial position PS of the vehicle 1 along the forward direction of the vehicle 1, and that passes through the initial position PS of the vehicle 1 and is tangent to the first circle S1 at a tangent point PC.

Returning to FIG. 9, the ECU 14 determines whether or not a second inner circumference circle S2a intersect the avoidance circle S3 (STEP S34). The second inner circumference circle S2a is a trajectory on which the left rear end portion of the vehicle 1 passes through, which is the innermost end portion of the vehicle 1, in a case where vehicle 1 moves along the second circle S2. The radius of the second inner circumference circle S2a is a value determined by the steering angle of the vehicle 1 in a case where the vehicle 1 moves along the second circle S2 and the length (vehicle length) of the vehicle 1 in the longitudinal direction. Here, the fact that the second inner circumference circle S2a intersects the avoidance circle S3 means that there is possibility that the left front end portion of the vehicle 1 approaches or collides with the rear right end portion OP of the parked vehicle 300a in the front direction.

In a case where it is determined that the second inner circumference circle S2a intersects the avoidance circle S3 (Yes in STEP S34), since the movement route RTP cannot be generated, the ECU 14 ends the route determination processing.

In a case where it is determined that the second inner circumference circle S2a does not intersect the avoidance circle S3 (No in STEP S34), the ECU 14 determines the movement route RTP (STEP S35).

Figure 12:
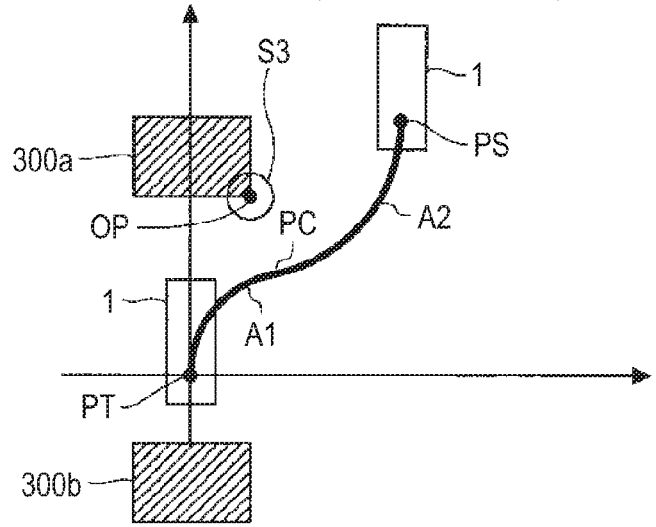
FIG. 12 is a diagram illustrating an overview of generating the movement route in the embodiment.

FIG. 12 is a diagram illustrating an overview of generating the movement route RTP. As illustrated in FIG. 12, the ECU 14 defines an arc from the target parking position PT to the tangent point PC on the circumference of the first circle S1 as an arc A1. The ECU 14 defines an arc from the initial position PS to the tangent point PC on the circumference of the second circle S2 as an arc A2. The ECU 14 links the arc A2 and the arc A1 and determines the movement route RTP from the initial position PS to the target parking position PT. Then, the ECU 14 ends the route determination processing.

Returning to FIG. 6, when the movement route RTP is determined, the ECU 14 proceeds the process to parking assistance control (STEP S15).

Figure 13:
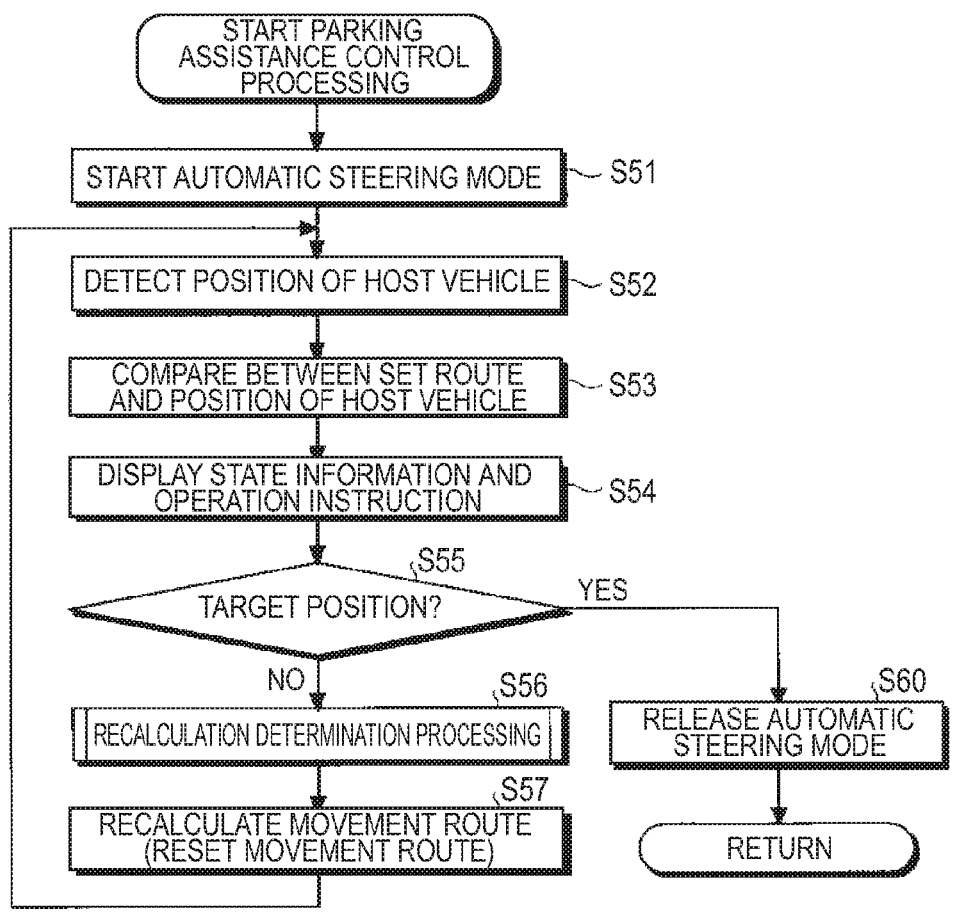
FIG. 13 is a flowchart of parking assistance control processing in the embodiment.

FIG. 13 is a processing flowchart of parking assistance control processing. First, the ECU 14 functions as the movement control unit 145, and starts an automatic steering mode which performs automatic steering in order to control each unit of the vehicle 1 such that the vehicle 1 moves to the target parking position PT that is the target position along the movement route RTP (STEP S51).

In the automatic steering mode, it is not necessary for the driver to perform the operation of the steering section 4, specifically the operation of the steering wheel. In addition, creeping which is a transferred driving force of the engine is used as a forward driving force and a backward driving force of the vehicle 1 at the time of the parking assistance control processing, without performing the operation of pressing the accelerator pedal which is an operation by the acceleration operation section 5.

Therefore, the driver performs only the operation of the brake pedal as the brake operation section 6 and the operation of the shift lever as the shift operation section 7 in accordance with the display on the display device 12.

Subsequently, the movement control unit 145 detects the position of the host vehicle (STEP S52). Specifically, the detection of the host vehicle by the movement control unit 145 (ECU 14) is a detection by calculating the distance and direction that is the amount of movement from the initial position PS based on the amount of steering of the steering section 4 detected by the steering angle sensor 19 and the vehicle speed detected by the vehicle wheel speed sensor 22.

In this way, the ECU 14 performs a comparison between the set route and the position of the host vehicle (STEP S53), and determines the state information about the vehicle and the operation instruction to the driver as a function of the output information determination unit 146, and then, displays the state information and the operation instruction on the display device 12 (STEP S54).

Subsequently, the ECU 14 functions as the movement control unit 145 and determines whether or not the position of the host vehicle reaches the target parking position PT as the target position (STEP S55).

Then, in a case where the position of the host vehicle does not reach the target parking position PT as the target position yet (No in STEP S55), the ECU 14 functions as the recalculation determination unit 148, and performs recalculation determination processing that determines whether or not the recalculation of the movement route RTP is necessary (STEP S56).

Figure 14:
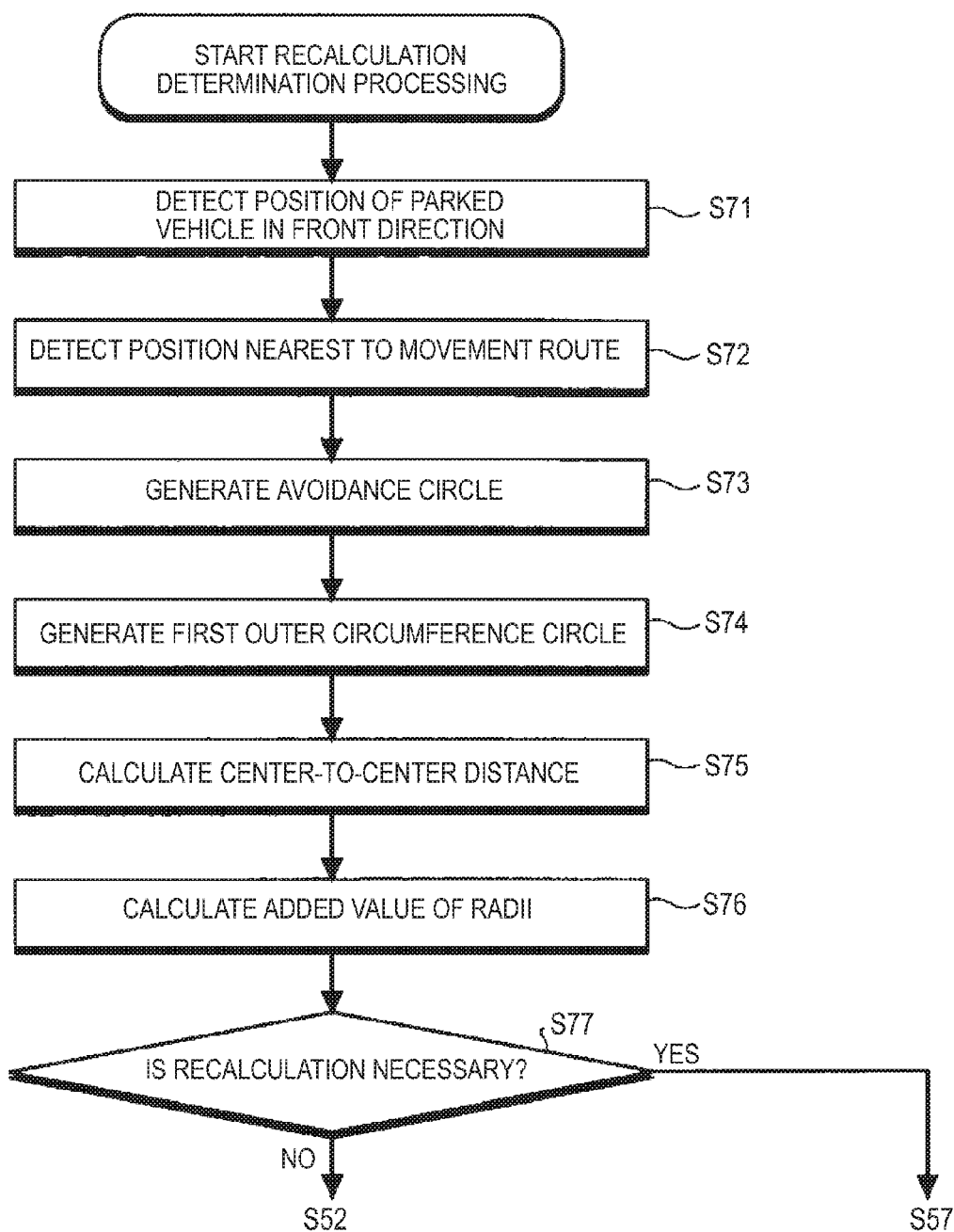
FIG. 14 is a flowchart of recalculation determination processing in the embodiment.
Figure 15:
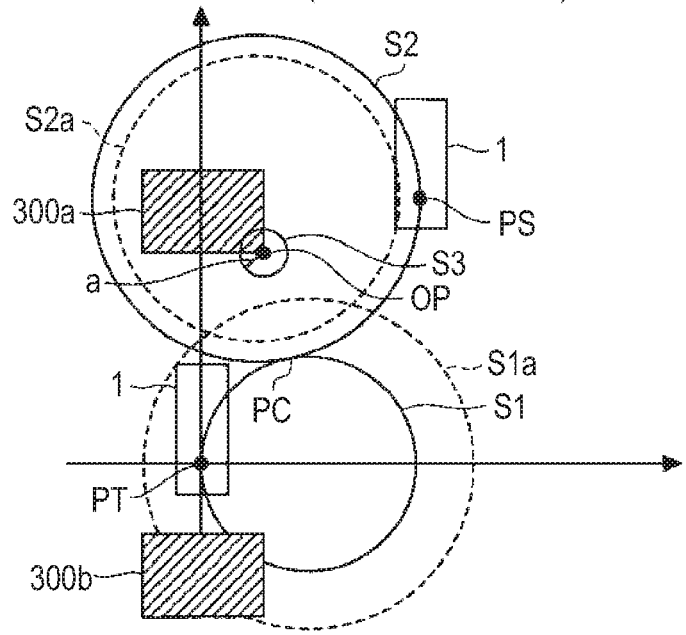
FIG. 15 is a diagram describing a determination of the recalculation in a case where the recalculation processing is not necessary in the embodiment.
Figure 16:
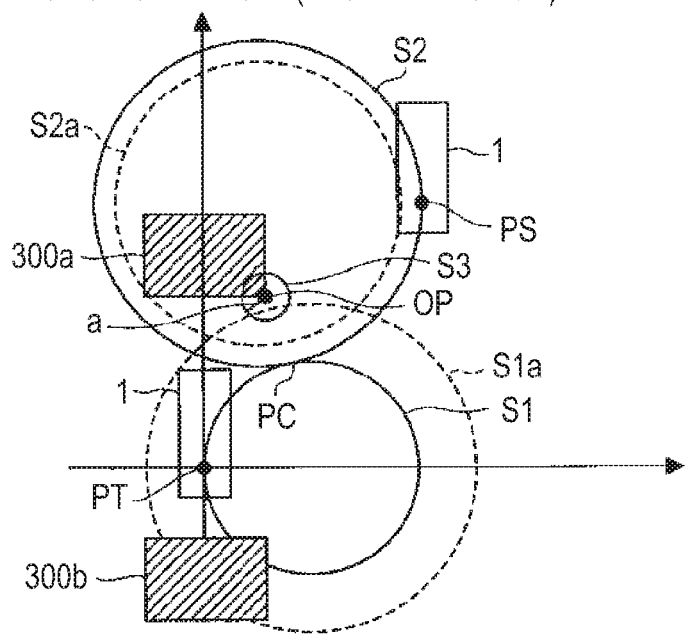
FIG. 16 is a diagram describing a determination of the recalculation in a case where the recalculation processing is necessary in the embodiment.

FIG. 14 is a flowchart of recalculation determination processing. FIG. 15 is a diagram describing the determination of the recalculation in a case where the recalculation processing is not necessary. FIG. 16 is a diagram describing the determination of the recalculation in a case where the recalculation processing is necessary.

As illustrated in FIG. 14, the ECU 14 newly detects a position of the parked vehicle 300a in the front direction (STEP S71). This re-detection is to cope with a case where the parked vehicle 300a in the front direction is moving or the like.

The ECU 14 detects the position of the parked vehicle 300a nearest to the movement route RTP (STEP S72). In the examples illustrated in FIG. 15 and FIG. 16 the ECU 14 detects the rear right end portion OP of the parked vehicle 300a as the position nearest to the movement route RTP.

The ECU 14 generates an avoidance circle S3 having a center at the rear right end portion OP of the parked vehicle 300a and having a radius as the avoidance margin a (STEP S73). An example of the avoidance margin a is 150 mm.

The ECU 14 generates a first outer circumference circle S1a that has a center common to the that of the first circle S1 and indicates a trajectory drawn by an outer end portion of the vehicle 1 (a front left end portion of vehicle 1 in the example illustrated in FIG. 15 and FIG. 16) when the vehicle 1 moves to the target position from the initial position (STEP S74). The circumference of the first outer circumference circle S1a is an example of a fourth circumference. The ECU 14 calculates a center-to-center distance that is a distance between the center of the first circle S1 (that is, the center of the first outer circumference circle S1a) and the center of the avoidance circle S3 (STEP S75). The ECU 14 calculates an added value obtained by adding the radius of the first outer circumference circle S1a to the radius of the avoidance circle S3 (STEP S76).

The ECU 14 determines whether or not the recalculation of the movement route RTP is necessary based on the first outer circumference circle S1a and the avoidance circle S3 (STEP S77). For example, the ECU 14 determines whether or not the recalculation of the movement route RTP is necessary based on the added value and the center-to-center distance. Specifically, the ECU 14 determines that the recalculation is necessary if the center-to-center distance is shorter than the added value.

For example, in the example illustrated in FIG. 15, since the center-to-center distance is equal to or longer than the added value, the ECU 14 determines that the recalculation is not necessary (No in STEP S77) and repeats the processes subsequent to STEP S52 without executing STEP S57 illustrated in FIG. 13. In other words, in a case where the first outer circumference circle S1a and the avoidance circle S3 do not intersect each other, the ECU 14 determines that the recalculation is not necessary.

On the other hand, in the example illustrated in FIG. 16, since the center-to-center distance is shorter than the added value, the ECU 14 determines that the recalculation is necessary (Yes in STEP S77), and executes the recalculation of the movement route RTP (STEP S57). In other words, in a case where the first outer circumference circle S1a and the avoidance circle S3 intersect each other, the ECU 14 determines that the recalculation is necessary.

Returning to FIG. 13, the ECU 14 functions as the movement route determination unit 144 again, and performs the recalculation of the movement route RTP, and resets the movement route (STEP S57). Specifically, the procedure of route determination processing described using FIG. 9 is executed. This is to keep the most optimal movement route RTP according to the actual situation because the vehicle 1 does not necessarily travel forward in accordance with the set movement route RTP due to the road situations or the like.

Then, the ECU 14 returns the process to STEP S52 and repeats the similar processing thereafter.

In STEP S55, in a case where the position of the host vehicle reaches the target parking position PT as the target position (Yes in STEP S55), the movement control unit 145 releases the automatic steering mode (STEP S60), and the ECU 14 displays end of the parking assistance processing on an instruction display area (not illustrated) of the screen 12a on the display device 12 to end the parking assistance processing.

In the present embodiment, in a situation in which the vehicle 1 does not reach the target parking position PT, the necessity of recalculation of the movement route RTP is determined based on the first circle S1 and the avoidance circle S3 having the radius as the avoidance margin a and having the center at the position of the parked vehicle 300a in the front direction nearest to the movement route RTP. In this way, in the present embodiment, the parked vehicle 300a in the front direction does not move and the probability of collision with the parked vehicle 300a in the front direction is low. Therefore, in a case where the recalculation of the movement route RTP is not necessary for the parallel parking which requires large amount of calculation processing, it is possible to omit the recalculation.

In the present embodiment, the necessity of the recalculation is determined based on the added value obtained by adding the radius of the first outer circumference circle S1a generated based on the first circle S1 to the radius of the avoidance circle S3, and the center-to-center distance of the first outer circumference circle S1a and the avoidance circle S3. Therefore, the time required for the recalculation can be reduced and the amount of above-described recalculation processing can be reduced.

The embodiment according to this disclosure is described, and the embodiment is presented as an example, and it is not intended to limit the scope of this disclosure. The new embodiment can be embodied in various other aspects, and various omissions, substitutions, changes can be performed without departing from the scope of this disclosure. Those embodiments or the modifications can be included in the range or scope of this disclosure and also included in the aspects of this disclosure and the equivalent range thereof.

For example, the avoidance margin a can be changed based on a posture of the driver or a height of the seat. That is, the length of the avoidance margin a may be designated and set by the operation unit 14g according to a height of the eyes based on the posture of the driver, and the height of the seat. In this case, the driver can perform the desired route determination.

In addition, the initial position PS of the vehicle 1 refers to a starting point on the second circumference, and the control of the vehicle 1 from the stating of the parking assistance for the vehicle 1 to the initial position PS is not excluded. For example, in a case where there is a difference in the directions to the target parking position PT at the initial position PS of the vehicle 1, the movement route determination unit 144 and the movement control unit 145 may be configured such that the vehicle 1 is moved to the initial position PS through the movement route RTP in which the angle of the vehicle 1 is adjusted before the vehicle 1 reaches the initial position PS, and then, the vehicle 1 can move along the movement route RTP which is based on the second circumference and the first circumference.

In the embodiment described above, the ECU 14 executes the recalculation determination processing in a case where the parking assistance is executed to the vehicle 1, but the embodiment described above is not limited thereto. For example, the ECU 14 may periodically determine the position of the parked vehicle 300a in the front direction and may execute the recalculation determination processing in a case where it is determined that the parked vehicle 300a in the front direction has moved. In this case, even in a case where the parked vehicle 300a in the front direction has moved, if the moving distance is short (for example, in a case where the moving distance is equal to or shorter than the predetermined threshold value), the ECU 14 may repeat the procedures subsequent to STEP S52 without executing the recalculation determination processing. In addition, in a case where the vehicle 1 is deviated from the set route, the ECU 14 may execute the recalculation determination processing.

A parking assistance device according to an aspect of this disclosure includes a route determination unit that determines a route from an initial position of a vehicle to a target position at a time of assisting the vehicle to be parked in a parking area. The route determination unit includes; a first generation unit that generates a first circumference which has a turning radius at the time of a minimum turning of the vehicle as a radius, and is tangent to a straight line passing through the target position and extends along a forward direction of the vehicle, a second generation unit that generates a second circumference which is tangent to a straight line passing through the initial position and extending along a forward direction of the vehicle and is tangent to the first circumference, and a recalculation determination unit that generates a third circumference having a center at the position on an obstacle disposed in the front direction of the vehicle nearest to the route at the time of parking the vehicle and having a predetermined radius, and determines whether or not the recalculation of the route is necessary based on the first circumference and the third circumference. A part of the first circumference functions as a part of the route, and a part of the second circumference functions as a part of the route subsequent to the part of the first circumference.

The parking assistance device according to the aspect of this disclosure determines the necessity of the recalculation based on the first circumference which is a part of the route and the third circumference having the center at the parked vehicle in the front direction. Therefore, it is possible to achieve an effect of reducing the recalculation of the route which is unnecessary in a case where the probability of collision with the parked vehicle in the front direction is low.

In the parking assistance device described above, the recalculation determination unit may determine whether or not the recalculation is necessary based on a center-to-center distance which is a distance between the center of the first circumference and the center of the third circumference, and an added value obtained by adding the radius of a fourth circumference which has a center common to that of the first circumference and corresponds to a trajectory drawn by an outer end portion of the vehicle when the vehicle moves from the initial position to the target position, to the radius of the third circumference.

With this configuration, the parking assistance device according to the aspect of this disclosure determines the necessity of the recalculation based on the center-to-center distance between the center of the first circumference and the center of the third circumference and the added value of the radii. Therefore, it is possible to reduce the probability of collision with the parked vehicle in the front direction and to reduce the unnecessary recalculation of the route.

In the parking assistance device described above, in a case where the center-to-center distance is shorter than the added value, the recalculation determination unit may determine that the recalculation is necessary.

With this configuration, the parking assistance device according to the aspect of this disclosure executes the recalculation in a case where the above-described center-to-center distance is shorter than the added value. Therefore, it is possible to reduce the time required for the determination of the recalculation and to reduce the unnecessary recalculation of the route.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device comprising:
a route determination unit that determines a route from an initial position of a vehicle to a target position at a time of assisting the vehicle to be parked in a parking area, wherein the route determination unit includes
- a first generation unit that generates a first circumference which has a turning radius at the time of a minimum turning of the vehicle as a radius, and is tangent to a straight line passing through the target position and extending along the forward direction of the vehicle,
- a second generation unit that generates a second circumference which is tangent to a straight line passing through the initial position and extending along a forward direction of the vehicle and is tangent to the first circumference, and
- a recalculation determination unit that generates a third circumference having a center at the position on an obstacle disposed in the front direction of the vehicle nearest to the route at the time of parking the vehicle and having a predetermined radius, and determines whether or not the recalculation of the route is necessary based on the first circumference and the third circumference, wherein a part of the first circumference functions as a part of the route, and wherein a part of the second circumference functions as a part of the route subsequent to the part of the first circumference.

2. The parking assistance device according to claim 1,
wherein the recalculation determination unit determines whether or not the recalculation is necessary based on a center-to-center distance which is a distance between the center of the first circumference and the center of the third circumference, and an added value obtained by adding the radius of a fourth circumference which has a center common to that of the first circumference and corresponds to a trajectory drawn by an outer end portion of the vehicle when the vehicle moves from the initial position to the target position, to the radius of the third circumference.

3. The parking assistance device according to claim 2,
wherein, in a case where the center-to-center distance is shorter than the added value, the recalculation determination unit determines that the recalculation is necessary.

* * * * *